No. 698,776. Patented Apr. 29, 1902.
G. H. WILLIAMS.
FRUIT BOX OR BASKET.
(Application filed Dec. 11, 1901.)
(No Model.)
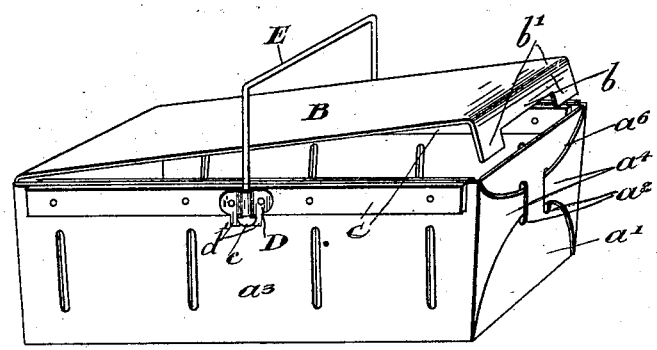
Fig. 3.
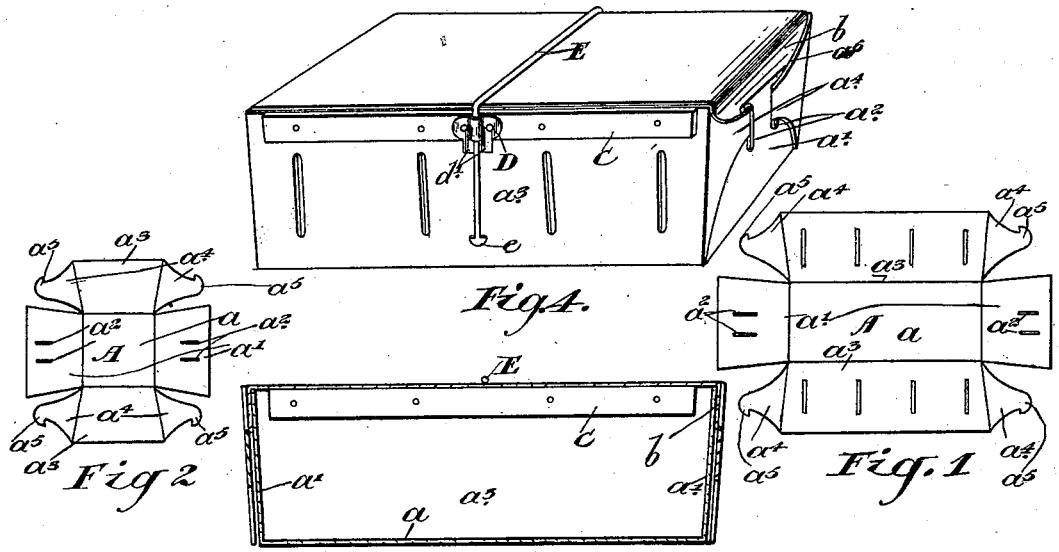
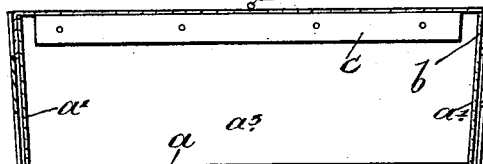
Fig. 5.
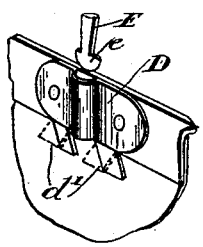
Fig. 7.
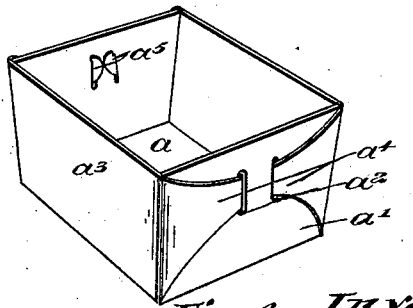
Fig. 6.
Witnesses
Inventor
G. H. Williams

UNITED STATES PATENT OFFICE.

GEORGE HARVEY WILLIAMS, OF THOROLD, CANADA.

FRUIT BOX OR BASKET.

SPECIFICATION forming part of Letters Patent No. 698,776, dated April 29, 1902.

Application filed December 11, 1901. Serial No. 85,489. (No model.)

*To all whom it may concern:*

Be it known that I, GEORGE HARVEY WILLIAMS, manufacturer, of the town of Thorold, in the county of Welland, in the Province of Ontario, Canada, have invented certain new and useful Improvements in Fruit Boxes or Baskets, of which the following is a specification.

My invention relates to improvements in fruit boxes or baskets; and the object of the invention is to devise a simple and cheap knockdown box or basket for fruit, in which the fruit may be placed, covered, and held and shipped without any danger of spilling; and it consists, essentially, of a blank formed from a rectangular piece of cardboard or thick paper, two opposing end flaps having twin slits in them and the remaining two having side tongues designed when the box is folded to fit into the slits and lock in the same, the edge of the box being reinforced and a lid and handle being provided, constructed, and arranged as hereinafter more particularly explained.

Figure 1 is a diminutive view of the blank cut out to form a basket. Fig. 2 is a similar view cut out to form a berry-box. Fig. 3 is a perspective view of the basket complete with the cover partially removed. Fig. 4 is a perspective view of the basket with the cover closed down. Fig. 5 is a longitudinal section of the basket. Fig. 6 is a perspective view of a berry-box complete. Fig. 7 is a detail of the handle and the connection thereof to the side of the basket.

In the drawings like letters of reference indicate corresponding parts in each figure.

A is the blank, comprising the bottom portion $a$ and the side flaps $a'\,a'$, with twin slits $a^2\,a^2$ in the center of the same. The sides of the blanks are preferably obliquely cut, as shown. $a^3\,a^3$ are side flaps, each provided with end tongues $a^4\,a^4$, cut out as shown and provided with a locking-hook $a^5\,a^5$. The side flaps $a^3\,a^3$ are fitted into position as indicated in Figs. 3, 4, and 6, the tongues $a^4$ being passed through the slits $a^2$ from the outside and the hooks $a^5$ being uppermost and locking to the inside of the slits, so as to hold the sides $a^3$ up.

It will be noticed that the tongues $a^4$ form to the outside of the side $a'$ of the box pockets $a^6$, as indicated.

B is a cover, which is provided with the end flaps $b\,b$, having depending tongues $b'\,b'$ toward each side. When the cover is put on, the tongues $b'\,b'$ fit into the pockets $a^6$ to each side of the slits $a^2\,a^2$.

C represents reinforcing-bars, preferably made of wood, which are suitably riveted to each side of the upper edge of the longitudinal sides of the basket. (Shown in Figs. 3, 4, and 5.) It is not necessary in a berry-box to provide these bars.

D represents ears fastened through the bars C by suitable rivets $d$. The central portion of the ears D are substantially semicylindrical in form, so as to permit of the passage of the bail E, which has a semicircular flattened end $e$, by which it may be sprung down through the hole and underneath the plate to each side of the hole, the flattened end being wider than the hole. The lower ends of the ears are provided with depending portions $d'$, which extend down straight when the flattened ends of the bails are being inserted; but as soon as the bails are passed sufficiently far down are bent inwardly, as indicated in full lines, so as to prevent the flattened ends from passing upwardly again, thereby securely holding the bail in position. When the bail is in the position shown in Fig. 3, the basket may be readily carried. For packing purposes and to hold the cover down, however, all it is necessary to do is to push the bail down close to the cover, and the spring of the bail will hold it securely in the ears, so that the cross-bar of the bail will hold the cover down.

It will be seen that the basket or box which I provide is very convenient, is cheaply made, and may be shipped in knockdown form previous to its being used for fruit.

What I claim as my invention is—

1. A fruit-box comprising the bottom and two opposite sides having central vertical slits and the two remaining sides having tongues narrowed at the outer end and provided with hooks designed to be inserted through the slits, so as to hold the sides in a substantially upright position and form pockets on the outside one on each side of the slits and an independent cover provided with end flaps and side depending tongues fitting into said pockets on each side of the slits as and for the purpose specified.

2. In an article such as described, the combination with the basket and the cover thereof and the narrow bail having wide flattened ends, of ears formed with a narrow central opening and suitably secured to the tops of the sides and provided with depending portions, said depending portions being designed to be bent inward to hold said bail in position, substantially as described.

3. A fruit-box comprising the bottom and two opposite sides having central vertical slits and the two remaining sides having tongues narrowed at the outer end and provided with hooks designed to be inserted through the slits, so as to hold the sides in a substantially upright position and the ears formed with a central opening and suitably secured to the tops of the sides and provided with depending portions and the bail extending through the openings in the ears and provided with flattened ends designed to be held in position by such depending portions as and for the purpose specified.

GEORGE HARVEY WILLIAMS.

Witnesses:
B. BOYD,
R. SHIELDS.